(12) United States Patent
Le

(10) Patent No.: US 10,407,088 B1
(45) Date of Patent: Sep. 10, 2019

(54) TRANSFORMABLE WHEELED CART AND METHOD OF USE

(71) Applicant: Tu Van Anh Le, Westminster, CA (US)

(72) Inventor: Tu Van Anh Le, Westminster, CA (US)

(*) Notice: Subject to any disclaimer, the term of this patent is extended or adjusted under 35 U.S.C. 154(b) by 0 days.

(21) Appl. No.: 16/147,667

(22) Filed: Sep. 29, 2018

Related U.S. Application Data

(60) Provisional application No. 62/567,142, filed on Oct. 2, 2017.

(51) Int. Cl.
*B62B 3/02* (2006.01)
*B62B 5/00* (2006.01)
*B62B 1/00* (2006.01)

(52) U.S. Cl.
CPC ........... *B62B 5/0003* (2013.01); *B62B 1/002* (2013.01); *B62B 2202/12* (2013.01); *B62B 2205/20* (2013.01)

(58) Field of Classification Search
CPC ........... B62B 5/003; B62B 5/06; B62B 5/064; B62B 5/067; B62B 5/065; B62B 1/002; B62B 3/02; B62B 3/022; B62B 3/027; B62B 2202/12; B62B 2205/20; B62B 5/0003
USPC ....................................... 280/47.18; 220/6, 7
See application file for complete search history.

(56) References Cited

U.S. PATENT DOCUMENTS

| | | | | |
|---|---|---|---|---|
| 2,212,053 A | * | 8/1940 | Smith | B62B 3/027 280/3 |
| 2,784,004 A | * | 3/1957 | Hamrick, Jr. | B62B 1/12 108/48 |
| 3,326,571 A | * | 6/1967 | Levine | B62B 3/027 280/641 |
| 3,684,307 A | * | 8/1972 | Bourgraf | B62B 1/12 280/654 |
| 4,714,013 A | * | 12/1987 | Telfer | F24C 1/16 126/9 R |
| 4,813,701 A | * | 3/1989 | Balland | B62B 3/027 280/641 |
| 5,328,042 A | * | 7/1994 | Heise | B65D 5/12 220/4.28 |
| 7,188,847 B1 | * | 3/2007 | Friedman | B62B 3/006 280/47.19 |
| 7,784,632 B2 | * | 8/2010 | Truong | B60R 7/02 220/6 |
| 10,106,182 B2 | * | 10/2018 | Camarco | B62B 3/022 |

FOREIGN PATENT DOCUMENTS

FR 2943026 A1 * 12/2009 ............... B62B 3/02

* cited by examiner

*Primary Examiner* — John D Walters
(74) *Attorney, Agent, or Firm* — Veritay Group IP; Susan B. Fentress

(57) ABSTRACT

The present invention relates to a transformable wheeled cart and the use thereof. The transformable wheeled cart is made of: a back frame made of an inner frame and an outer frame. The inner frame is configured to move within the outer frame from a first vertical position to a second horizontal position. A front frame made of a plurality of connectors positioned on the front frame to connect with the inner frame when the inner frame is in the second horizontal position; wherein the front frame retains a rectangular perforated panel, the rectangular perforated panel further comprises a connector to connect to the back frame; and a plurality of wheels connected to the cart.

15 Claims, 5 Drawing Sheets

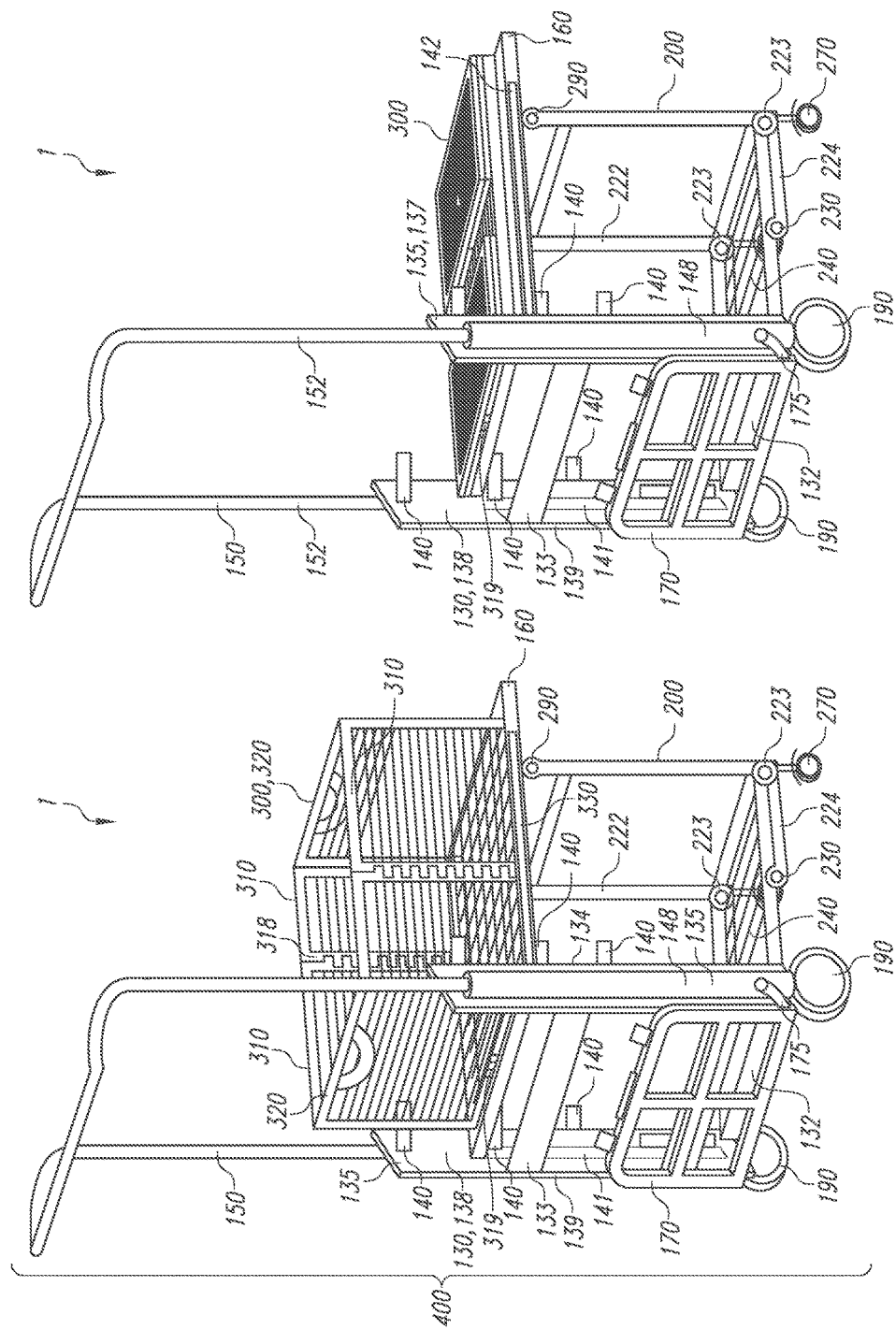

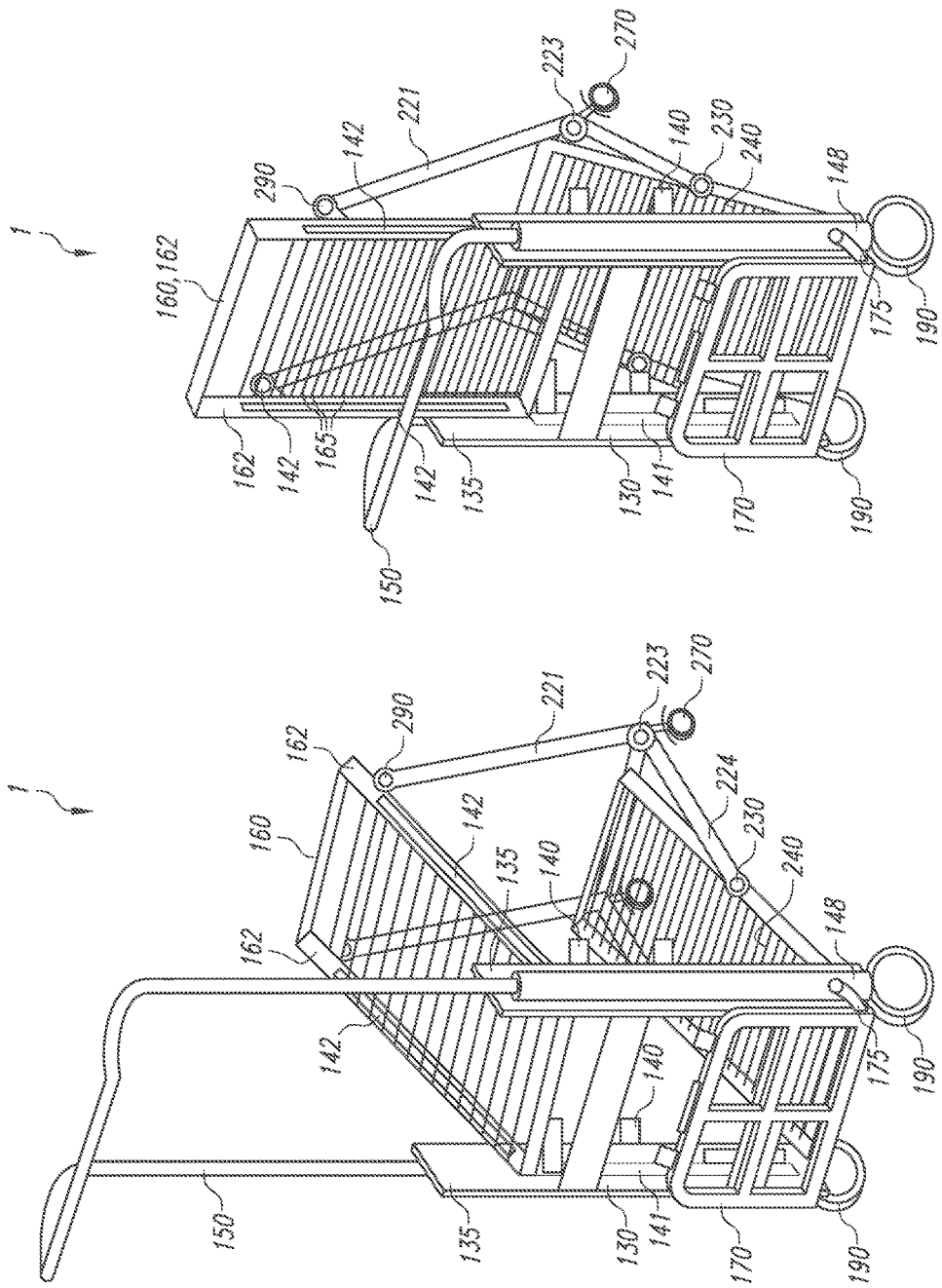

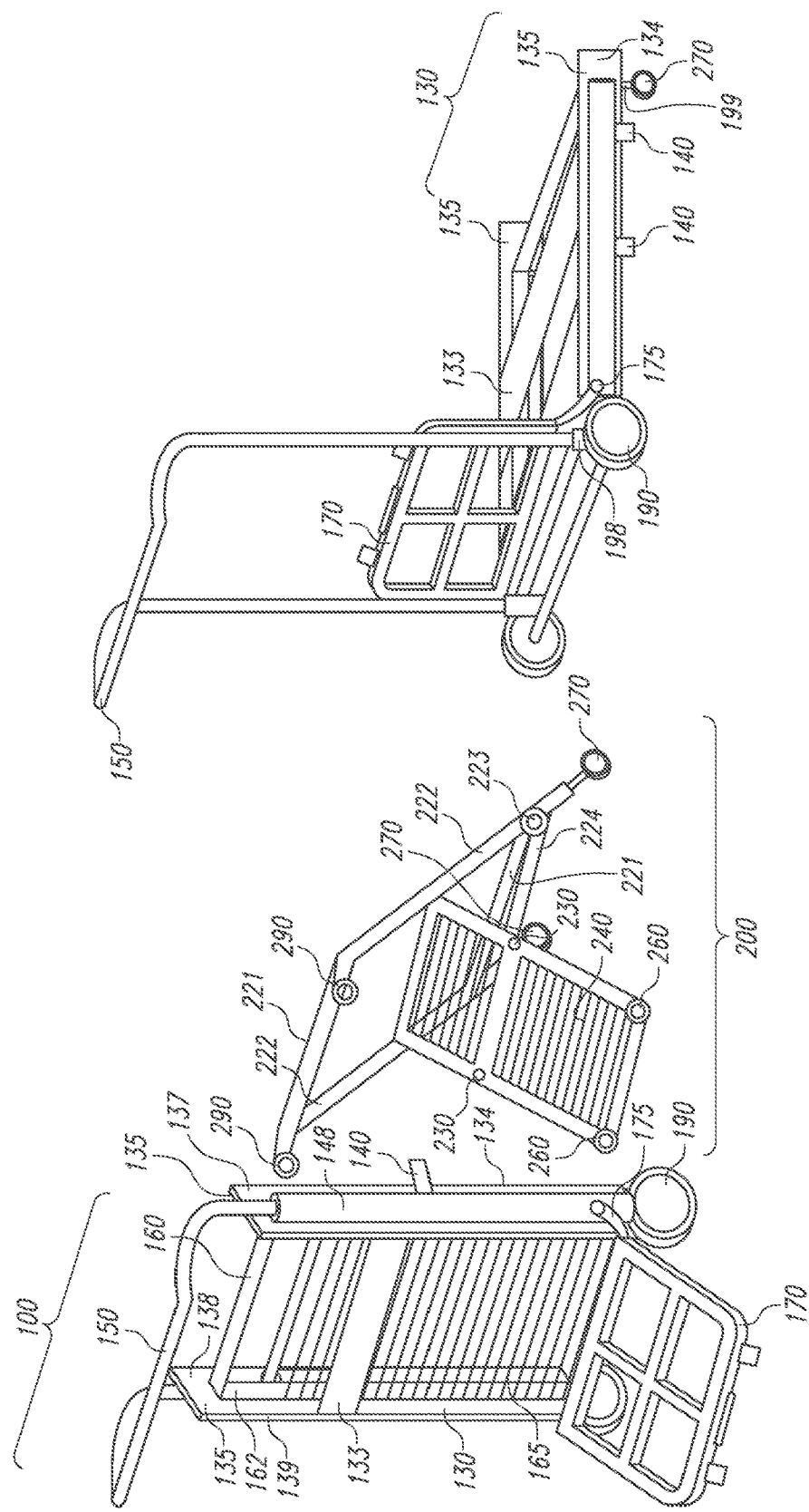

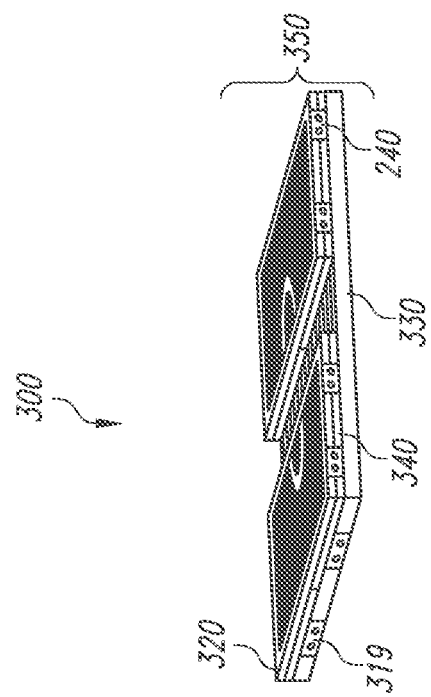
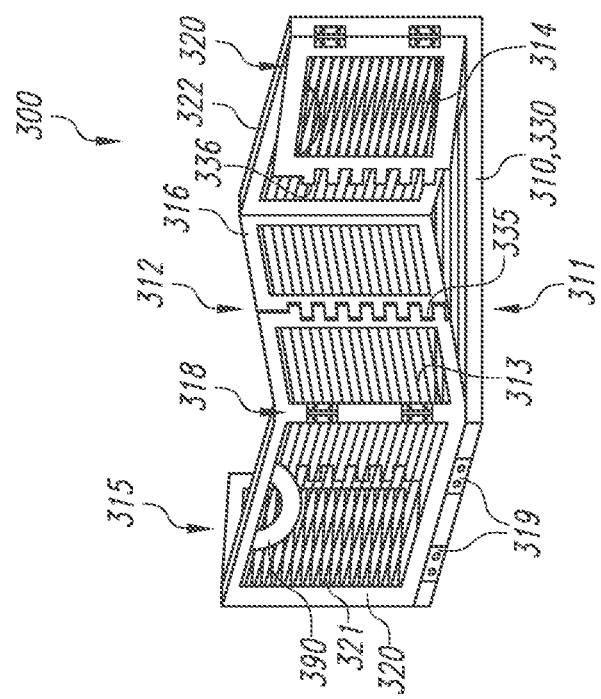
FIG. 8A
FIG. 8B

TRANSFORMABLE WHEELED CART AND METHOD OF USE

CROSS REFERENCE TO RELATED APPLICATIONS

This application is a non-provisional application of U.S. provisional 62/567,142 filed Oct. 2, 2017 under 35 USC § 119(e) (hereby incorporated by reference in its entirety).

FIELD OF THE INVENTION

The subject matter of this invention generally relates to the field of wheeled carts and cargo carrying apparatus and particularly to wheeled cargo carrying apparatus for transporting groceries or supplies.

BACKGROUND OF THE INVENTION

This application relates to a wheeled cargo carrying apparatus that can be deployed in a variety of configurations for multiple purposes. Numerous patents have issued for specific uses such as folding baby strollers and golf club carriers.

SUMMARY OF THE INVENTION

This application relates to a wheeled cargo carrying apparatus that can be deployed in a variety of configurations for multiple purposes. For example, when deployed, the transformable wheeled cart can coordinate with the trunk of a car to load and unload groceries or supplies in and out of the car or provide a storage bin for groceries or supplies or tow groceries or supplies to a desirable destination. In another configuration, it can be a shopping cart with multiple baskets. In another configuration, it can function as a hand-truck or utility cart to move supplies. In another configuration, it can become a flat rectangle for storage or carry-on purpose.

This inventive subject matter relates to a transformable wheeled cart and the use thereof. The transformable wheeled cart is made of: a back frame made of an inner frame and an outer frame. The inner frame is configured to move within the outer frame from a first vertical position to a second horizontal position and a first plurality of receivers connected to the back frame configured to receive a detachable handle. The inner frame is configured to move within the outer frame from a first vertical position to a second horizontal position. A front frame made of a plurality of connectors positioned on the front frame to connect with the inner frame when the inner frame is in the second horizontal position; wherein the front frame retains a rectangular perforated panel, the rectangular perforated panel further includes a connector to connect to the back frame; and a plurality of wheels connected to the back frame and to the front frame of the transformable wheeled cart.

The present invention relates to a transformable wheeled cart and the use thereof. The transformable wheeled cart is made of: a back frame having an inner frame and an outer frame, wherein the outer frame has a rectangular shape and it is made of a base member, a plurality of side members and a structural support member affixed to each of the plurality of side members. The inner frame has a rectangular shape and is made of a four-sided frame and a plurality of consecutively spaced wire or perforated bars positioned within the inner frame. The inner frame is slideably connected to the outer frame and a front frame. The front support frame is made of an at least two horizontal support members and an at least two vertical support members, further including a plurality of connectors positioned on the front frame to connect with the inner frame; a plurality of arms, each arm projecting away from each of the two vertical support members, each arm having a locking hinge positioned at the terminal end of the arm; and a rectangular perforated panel, the rectangular perforated panel further comprises a connector to connect to the back frame, wherein the rectangular perforated panel is connected to the locking hinge of each of the plurality of arms.

The present invention relates to a removable foldable shopping cart basket made of a plurality of long sides, wherein the plurality of long sides is made of a front long side and a back long side. The front long side is made of a first panel and a second panel. The back long side is made of a third panel and a fourth panel. The foldable shopping cart basket also includes: a plurality of short sides wherein the plurality of short sides is made of a left short side panel and a right short side panel wherein the first panel and the third panel are connected to the left short side panel by a hinge and the second panel and the fourth panel are connected to the right short side panel by a hinge and wherein the first panel and a second panel are detachably connected by a connector, and the third panel and the fourth panel are detachably connected by a connector; and a base wherein the base is connected to the left short side by a hinge and the right short side by a hinge.

The present invention relates to a method to transform a cart. This method can be practiced in either the forward or reverse to obtain the desired configuration. The method includes the steps of: providing a shopping cart made of: a back frame having an inner frame and an outer frame, wherein the outer frame has a rectangular shape made of a base member, a plurality of side members and a structural support member affixed to each of the plurality of side members. The inner frame has a rectangular shape made of a four-sided frame and a plurality of consecutively spaced wire or perforated bars positioned within the inner frame. The inner frame is slideably connected to the outer frame. The front frame has at least two horizontal support members and an at least two vertical support members. The cart further includes a plurality of connectors positioned on the front frame to connect with the inner frame; a plurality of arms, each arm projecting away from each of the two vertical support members, each arm having a locking hinge positioned at the terminal end of the arm; a rectangular perforated panel, the rectangular perforated panel further includes a connector to connect to the back panel, wherein the rectangular perforated panel is connected to the locking hinge of each of the plurality of arms; and a foldable shopping cart basket connected to the inner frame, wherein the foldable shopping cart basket is made of: a plurality of long sides, wherein the plurality of long sides is comprised of a front long side and a back long side, the front long side is comprised of a first panel and a second panel and the back long side is made of a third panel and a fourth panel; a plurality of short sides wherein the plurality of short sides is made of a left short side panel and a right short side panel wherein the first panel and the third panel are connected to the left short side panel by a hinge and the second panel and the fourth panel are connected to the right short side panel by a hinge and wherein the first panel and a second panel are detachably connected by a connector, and the third panel and a fourth panel are detachably connected by a connector; and a base wherein the base is connected to the left short side by a hinge and the right short side by a hinge. The process includes the steps of: folding the shopping basket; and removing the shopping basket from the cart. The method further includes the steps of: rotating the inner frame into the back outer frame whereby the back frame and front frame are parallel and form a 0° angle to become a flat rectangle for storage or carry-on. The method further includes the steps of: rotating the inner frame into the back outer frame whereby the back frame and front frame are parallel; removing the front frame and rotating the rectangular platform connected by a hinge to the base of the back frame to be parallel with the ground to form a hand-truck. The method further includes the steps of: removing the detachable handle from the tapered cylindrical member attached to the outer frame; removing the front frame; rotating the back frame from the vertical to a horizontal orientation with respect to the ground; and fixing the detachable handle in a receiver in said back frame base, wherein the second receiver is located 90 degrees from the tapered cylindrical member attached to the outer frame and attaching removable wheels to the outer frame to form a utility cart.

BRIEF DESCRIPTION OF THE DRAWINGS

FIG. 1 shows a schematic view of a transformable wheeled cart in an unfolded configuration with the basket in the expanded position.

FIG. 2 shows a schematic view of a transformable wheeled cart in an unfolded configuration with the basket in the collapsed position.

FIG. 3A shows a schematic view of a transformable wheeled cart in an unfolded configuration with the basket detached in the process of folding.

FIG. 3B shows a schematic view of a transformable wheeled cart in the process of folding.

FIG. 4 shows a schematic view of a transformable wheeled cart in the folded portion for storage or carry-on.

FIG. 6 shows a schematic view of a transformable wheeled cart in the utility cart configuration with a completely detached front frame.

FIG. 7 shows a schematic view of a transformable wheeled cart in the utility cart configuration.

FIG. 8A shows a schematic view of a transformable wheeled cart in the process of folding the basket.

FIG. 8B shows a schematic view of the basket as it is folded for storage or carry-on.

DETAILED DESCRIPTION OF THE INVENTION

Figure 5:
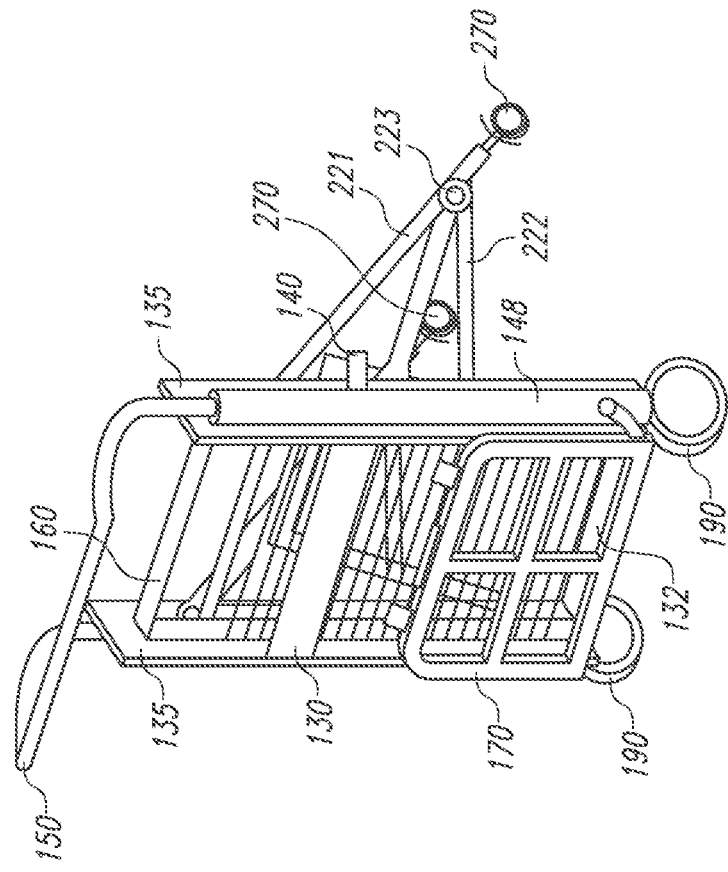
FIG. 5 shows a schematic view of a transformable wheeled cart in the process of detaching the front frame and back frame.

The present invention may be understood more readily by reference to the following detailed description of the invention. It is to be understood that this invention is not limited to the specific devices, methods, conditions or parameters described herein, and that the terminology used herein is for describing embodiments by way of example only and is not intended to be limiting of the claimed invention. Also, as used in the specification including the appended claims, the singular forms "a," "an," and "the" include the plural, and reference to a numerical value includes at least that value, unless the context clearly dictates otherwise. Ranges may be expressed herein as from "about" or "approximately" one value and/or to "about" or "approximately" another value.

Now referring to FIGS. 1, 2, 3A-3B and 6, a transformable wheeled cart 1 is shown. The transformable wheeled cart 1 as shown in FIG. 1 can be used as a shopping cart in a store to shop for goods. The goods at check-out can be placed directly into the cart to obviate the need for bags and towed to shopper's car where the transformable wheeled cart 1 can coordinate with car trunk to load or unload entire goods at one time by detaching or attaching the basket from or to the inner frame 160 of the transformable wheeled cart 1. The transformable wheeled cart 1 can be folded and placed in a truck of a car. The basket 300 can be used for storage in a dwelling.

A transformable wheeled cart 1 is made of: two detachable/connectable frames: a back frame 100 and a front frame 200. The back frame 100 and the front frame 200 are typically made of steel or an engineered plastic. The back frame 100 is of a rectangular shape formed of an outer frame 130 and an inner frame 160. The inner frame 160 is sized to fit within the outer frame 130.

The outer frame 130 has a rectangular shape and is a made of a base member 132, a plurality of side members 135 and a structural support member 133. The plurality of side members 135 are formed from a front-side edge 134, a back-side edge 139, an outside surface 137 and an inside surface 138. A structural support member 133 is affixed to the front-side edge 134 of each of the plurality of side members 135. The inside surface 138 can include a slidable connection member 141 such as a channel configured to retain a slide. The outer frame 130 is open at the top and forms a pocket to receive the inner frame 160.

The inner frame 160 has a rectangular shape and is a made of a four-sided frame member 162 and a plurality of consecutively spaced wire or perforated plastic bars 165 are positioned within the side-frame 162. The vertical frame members of the four-sided frame members 162 of inner frame 160 include a connection member 142 to connect with the slidable connection member 141 of the outer frame 130. The inner frame 160 is slideably connected to the outer frame 130. The inner frame 160 is configured to move up and down inside of the back frame 100 using a rail system or other similar techniques.

As shown in FIG. 1 the inner frame 160 is in the horizontal position and primarily disposed outside of the outer frame 130. In this configuration, the transformable wheeled cart 1 can be used as a shopping cart. The inner frame 160 can be positioned at in a vertical or horizontal orientation, in the transformable wheeled cart 1, depending on the utility required. When the inner frame 160 is pivoted to the horizontal position it can be retained by a lock (not shown).

The back frame 100 includes a plurality of projections 140 that can project from the front side edge 134 of each of the side members 135 of the back frame 130. However, it is possible to position the plurality of projections 140 on a back-side edge 139, an outside surface 137 and an inside surface 138 if that design is desirable. Preferably, the plurality of projections 140 are spaced at six-inch intervals. Each of the projections 140 on the side member 135 are level with each other and they form a base upon which the inner frame 160 is positioned when then the inner frame 160 is in the horizontal position. A plurality of projections 140 is placed on the inner frame 160 when it is in the horizontal position. The plurality of projections 140 can also function as a locking mechanism to retain the plurality of projections 140 wherein the plurality of projections 140 are configured with a closing or snapping mechanism.

A first plurality of receivers 148 such as tapered cylindrical tubes is connected to each of the plurality of side members 135 of the outer frame 130 to provide height adjustment of a detachable handle 150. In this exemplary embodiment, the first plurality of receivers 148 are positioned on the outside surface 137 of each of the plurality of side members 135. A detachable handle 150 is configured to be retained by a first plurality of receivers 148 such as a tapered cylindrical tube. The detachable handle 150 is preferably of a "U" shape with a plurality of ends 152 sized to fit within each of tapered cylindrical member 148. The first plurality of receivers 148 such as a tapered cylindrical member narrows in diameter to retain a detachable handle 150.

A small rectangular platform 170 is attached by a hinge 175 and can swing parallel to the back frame 130 or create a 0°-90° angles to the base 132 of the back frame 130 to form a platform for use on the hand-truck cart configuration. At least two fixed wheels 190 are connected to side member 135.

Now referring to FIG. 6, the front frame 200 is also of a rectangular shape. The front frame 200 is made of at least two horizontal support members 221 and at least two vertical support members 222. A locking hinge 223 is positioned between each of vertical support members 222 and arm 224. A plurality of connectors 290 are positioned on the front frame 200 to connect with the inner frame 160.

The front frame 200 is moveably connected to a rectangular perforated panel 240 by arm 224. An arm 224 projects from each of the two vertical support members 222. A locking hinge 230 is positioned at the terminal end of each arm 224. The locking hinge 230 is connect to a rectangular perforated panel 240 attached hereto. The front frame 200 can create a 0°-90° angles when hinge 230 is unlocked. When the 90° angle is formed, the front frame 200 is parallel with the back frame 100.

The rectangular perforated panel 240 includes a plurality of connectors 260 that can detachably attach to the back panel 100. The rectangular perforated panel 240 can be attached or detached to the base 132 of the back frame 100 by a connection means such as by nut and bolt. Once the back frame 100 and front frame 200 are connected, and the inner frame 160 and the rectangular perforated panel 240 are in the horizontal position, a basket 300 can be placed on the surface formed by the inner frame 160 when it is in the horizontal position. The front frame 200 also included a plurality of detachable wheels 270.

The plurality of horizontal projections 140 on each of the side members 135 of the back frame 100, when the inner frame 160 is in the second horizontal position, is supported in-part by at least one of the plurality of horizontal projections 140, similarly the inner frame 160 in the second horizontal position is supported in part by the front frame 200. The inner frame 160 is in the second horizontal position, forms a stable platform upon which the detachable basket 300 can be placed.

Now referring to FIGS. 8A and 8B, a detachable basket 300 of a rectangular shape is provided. The detachable basket 300 is configured to be both removable and foldable to provide various configurations of the transformable wheeled cart 100. The basket 300 is made of wire, perforated metal or plastic. The basket 300 has two long sides 310, two short sides 320 and a base 330. The long side 310 has a front long side 311 and a back long side 312. The front long side 311 is made of a first panel 313 and a second panel 314. The back long side 312 is made of a third panel 315 and a fourth panel 316. The two short sides 320 are made of a left short side panel 321 and a right short side panel 322. The first panel 313 and the third panel 315 are connected to the left short side panel 321 by a hinge 318. The second panel 314 and the fourth panel 365 are connected to the right short side panel 322 by a hinge 319. The first panel 313 and a second panel 314 are detachably connected by a connector 335 such as male and female connectors running the vertical length of the panels, while the third panel 315 and a fourth panel 316 are detachably connected by a connector 336, such as male and female connectors running the vertical length of the panels. A base 330 supports the basket and the contents therein and the base 330 is connected to the left short side 321 by a hinge 319 and the right short side 322 by a hinge (not shown)

Now referring to FIG. 8A, each of the long sides 310 are in the process of swinging inwardly to be positioned parallel with two short sides 320. Once the panels are parallel to form a stack of panels 340, the stack of panels 340 are rotated inwardly as shown in FIG. 8B to form the flat basket 350. Each of the two long sides 310 is formed of two front long panels 311 and 312 with a hinge 315 between each of the panels 315.

In order to form the basket 300, the steps include: pushing the short sides to create a 90° angle to the base 330, and pulling the long sides 310 to create a 90° angle to the short sides 320; then the long sides 310 are connected and can be secured by bolt or tie (not shown). In order to fold the basket 300, reverse steps need to be taken. A handle 390 is affixed to the basket 300. The basket 300 can be placed on top of the inner frame 160 of the back frame 100. The basket 300 is secured by the plurality of projections 140. To move the basket 300 from the shopping cart, the plurality of projections 140 are released.

Now referring to FIGS. 1 and 6, the shopping cart configuration is shown in FIG. 1. In the shopping cart configuration, the back frame 100 and front frame 200 are connected to form the connected frame 400. The back frame 100 and the front frame 200 are detachably connected at the lower level by a connector 260 connecting to a receiver (not shown) positioned in the front-side edge 134 of each of the plurality of side members 135. A receiver is hollow and when connector 260 arrives, a user can use a nut and bolt to obtain the connected frame 400, but still offer the swinging capability for the rectangular perforated panel 240. In the upper level, the back frame 100 and the front frame 200 are detachably connected by a connector 290 connecting to a receiver (not shown) positioned in the inner frame 160 of back frame 100. A receiver is hollow and when connector 290 arrives, the user can use a nut and bolt obtain the connected frame 400 but still offer swinging capability for front frame 200.

The front frame 200 is moveably connected to a rectangular perforated panel 240 by arm 224. An arm 224 projects from each of the two vertical support members 222. A locking hinge 230 is positioned at the terminal end of each arm 224. The locking hinge 230 is connect to a rectangular perforated panel 240 attached hereto. The front frame 200 can create a 0-90° angles when hinge 230 is unlocked. When the 90° angle is formed the front frame 200 is parallel with the ground to form a surface to receive objects. The rectangular perforated panel 240 includes a plurality of connectors 260 that can detachably attach to the back panel 100. The rectangular perforated panel 240 can be attached or detached to the base 132 of the back frame 100 by a connection means such as by nut & bolt. Once the back frame 100 and front frame 200 are connected, a basket 300 can be placed on the surface formed by the inner frame 160 when it is in the horizontal position. The front frame 200 also included a plurality of detachable wheels 270. The front frame 200 is also of a rectangular shape. The front frame 200 is made of at least two horizontal support members 221 and at least two vertical support members 222. A plurality of connectors 290 are positioned on the front frame 200 to connect with the inner frame 160.

The back frame 100 includes a plurality of projections 140 on each of the side members 135 of the back frame 130. Preferably, the plurality of projections 140 are spaced at six-inch intervals. Each of the projections 140 on the side member 135 are level with each other and they form a base upon which the inner frame 160 is positioned when the inner frame 160 is in the horizontal position. A basket 300 is placed on the inner frame 160 when it is in the horizontal position. The transformable wheeled cart 1 in the shopping cart configuration can be used in a store to obtain supplies and can also be used to transport the supplies to a dwelling.

Now referring to FIGS. 2 and 8B, a transformable wheeled cart 1 with the connected frame 400 shows the basket 300 in the collapsed position.

Figure 4:
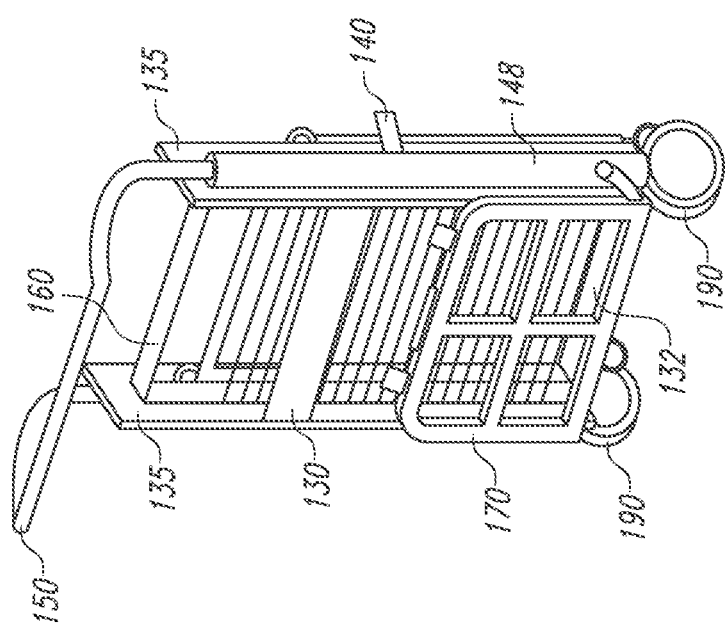

FIGS. 3A, 3B and 4 show a schematic view of a transformable wheeled cart 1 in the folded portion for storage or carry-on. A user follows this method to configure the cart for storage or carry-on. First lift the open end of inner frame 160 and rotate it until it creates a 90-degree angle with the ground, then push the inner frame 160 into the outer frame 130 completely for carry-on or storage. While the inner frame 160 is lifted and rotated, the rectangular perforated panel 240 follows and forms any angles less than 90-degree with the back frame because of its connection with the front frame and front frame connection to the inner frame. While the inner frame 160 is sliding into the outer frame 130 completely, the rectangular perforated panel 240 forms a 0-degree with the back frame and a transformable wheeled cart 1 becomes a flat rectangle at show in FIG. 4 for storage or carry-on. The reverse of the process needs to be taken to make a transformable wheeled cart 1 ready to use.

Now referring to FIGS. 5, 6 and 7 the transformable wheeled cart 1 is shown in the process of being configured to be a hand-truck (FIG. 6) or utility cart (FIG. 7) by removing a nut and bolt from the connector 260 and 290. In the first step of the process, the back frame 100 and a front frame 200 are separated). In the first step of the process, the front frame 200 moves away from the back frame 100 and create at least 35° angles with the back frame 100 at show in FIG. 5. In that respect, the back frame 100 and a front frame 200 are in configuration to make them accessible to remove a nut and bolt from the connector 260 and 290. As the result, the back frame 100 and a front frame 200 are separated.

To be configured into a utility cart, as shown in FIG. 7, the outer frame 130 has a wheel receiver 199 such as at least two vertical threading hollows on the edge 134 of each side member 135 to accommodate attachable wheels 270. Now referring to FIG. 6, in the first step of the process, the back frame 100 and a front frame 200 are separated by removing connectors 290 & 260 which connect vertical support members 222 to the inner frame 160 and the rectangular perforated panel 240 to the base 132. A hand-truck cart can be formed by swinging small rectangular platform 170 to create 90° angles to the base 132 of the back frame 100. The height of the detachable handle 150 needs to be adjusted to support configuration of a hand-truck cart. The reverse of the process needs to be taken to transform a hand-truck cart to a transformable wheeled cart 1.

Now referring to FIG. 7, the detachable handle 150 is removed from tube 138. The back frame 100 is pivoted forward so that the outer frame 130 is a horizontal orientation with respect to the ground. The detachable handle 150 is removed from tube 138 and fastened into a second plurality of receivers for the handle 198 on the side members 135. The second plurality of receivers 198 are positioned 90 degrees to the first plurality of receivers 148 for the detachable handle 150. The outer frame 130 has a wheel receiver 199 such as at least two vertical threading hollows on the edge 134 of each side member 135 to accommodate attachable wheels 270. The reverse of the process needs to be taken to transform a utility cart to a transformable wheeled cart 1.

While the invention has been described regarding preferred and exemplary embodiments, it will be understood by those skilled in the art that a variety of modifications, additions and deletions are within the scope of the invention, as defined by the following claim.

I claim:

1. A transformable wheeled cart comprising:
   a back frame comprised of an inner frame and an outer frame, wherein the inner frame is configured to move within the outer frame from a first vertical position to a horizontal position and a first plurality of receivers connected to the back frame configured to receive a detachable handle;
   a front frame comprised of a plurality of connectors positioned on the front frame to connect with the inner frame, when the inner frame of the back frame is in the horizontal position; wherein the front frame retains a rectangular perforated panel, the rectangular perforated panel further comprises a connector to connect to the back frame; and
   a plurality of wheels connected to the back frame and to the front frame of the transformable wheeled cart.

2. The transformable wheeled cart of claim 1 further comprising: a removable basket positioned on the inner frame, when the inner frame is in the horizontal position.

3. The transformable wheeled cart of claim 2 wherein the removable basket is foldable, comprising: a plurality of long sides, wherein the plurality of long sides is comprised of a front long side and a back long side, the front long side is comprised of a first panel and a second panel and the back long side is comprised of a third panel and a fourth panel;
   a plurality of short sides wherein the plurality of short sides is comprised a left short side panel and a right short side panel wherein the first panel and the third panel are connected to the left short side panel by a hinge and the second panel and the fourth panel are connected to the right short side panel by a hinge and wherein the first panel and a second panel are detachably connected by a connector, and the third panel and a fourth panel are detachably connected by a connector; and
   a base wherein the base is connected to the left short side by a hinge and the right short side by a hinge, wherein the foldable basket is connected to the inner frame of the back frame.

4. The transformable wheeled cart of claim 1 wherein,
   the back frame comprised of an inner frame and an outer frame, wherein the outer frame has a rectangular shape comprised of a base member, a plurality of side members and a structural support member affixed to each of the plurality of side members and the inner frame has a rectangular shape comprised of a four sided frame and a plurality of consecutively spaced bars positioned within the inner frame;
   and the front frame comprised of:
   an at least two horizontal support members and an at least two vertical support members, further comprising a plurality of connectors positioned on the front frame to connect with the inner frame when the inner frame is in the horizontal position; and a plurality of arms, each arm projecting away from each of the two vertical support members, each arm having a hinge positioned at the terminal end of the arm; and a rectangular perforated panel, the rectangular perforated panel further comprises a connector to connect to the back frame, wherein the rectangular perforated panel is connected to the hinge of each of the plurality of arms.

5. The transformable wheeled cart of claim 4, further comprising a second plurality of receivers connected to the back frame configured to receive the detachable handle.

6. The transformable wheeled cart of claim 5 wherein the second plurality of receivers for the detachable handle are positioned on each of the plurality of side members, and wherein the second plurality of receivers are positioned 90 degrees to said first plurality of receivers for the detachable handle.

7. The transformable wheeled cart of claim 4, wherein the plurality of wheels connected to the back frame are fixed to the side members of the outer frame.

8. The transformable wheeled cart of claim 4, wherein the plurality of wheels connected to the front frame are detachable.

9. The transformable wheeled cart of claim 4 further comprising: a plurality of horizontal projections on each of the side members of the back frame, wherein the inner frame in the horizontal position is supported in part by at least one of the plurality of horizontal projections.

10. The transformable wheeled cart of claim 9 wherein the inner frame in the horizontal position and is supported in part by the front frame.

11. The transformable wheeled cart of claim 4 further comprising: a rectangular platform connected by a hinge to the base of the back frame.

12. A method to transform a cart comprising the steps of:
providing a shopping cart comprising:
a back frame comprised of an inner frame and an outer frame, wherein the outer frame has a rectangular shape comprised of a base member, a plurality of side members and a structural support member affixed to each of the plurality of side members and the inner frame has a rectangular shape comprised of a four sided frame and a plurality of consecutively spaced wire or perforated bars positioned within the inner frame, wherein the inner frame is slideably connected to the outer frame;
a first plurality of receivers connected to the back frame configured to receive a detachable handle;
a front frame comprised of:
an at least two horizontal support members and an at least two vertical support members, further comprising a plurality of connectors positioned on the front frame to connect with the inner frame;
a plurality of arms, each arm projecting away from each of the two vertical support members, each arm having a locking hinge positioned at the terminal end of the arm;

a rectangular perforated panel, the rectangular perforated panel further comprises a connector to connect to the back panel, wherein the rectangular perforated panel is connected to the locking hinge of each of the plurality of arms;

a plurality of wheels connected to the back frame and to the front frame of the transformable wheeled cart;

and a foldable shopping cart basket connected to said inner frame, wherein said foldable shopping cart basket is comprised of: a plurality of long sides, wherein the plurality of long sides is comprised of a front long side and a back long side, the front long side is comprised of a first panel and a second panel and the back long side is comprised of a third panel and a fourth panel;

a plurality of short sides wherein the plurality of short sides is comprised of a left short side panel and a right short side panel wherein the first panel and the third panel are connected to the left short side panel by a hinge and the second panel and the fourth panel are connected to the right short side panel by a hinge and wherein the first panel and a second panel are detachably connected by a connector, and the third panel and a fourth panel are detachably connected by a connector; and a base wherein the base is connected to the left short side by a hinge and the right short side by a hinge;

folding the shopping basket; and removing the shopping basket from the cart.

13. The method of claim 12 further comprising the step of:
rotating the inner frame into the back outer frame, whereby the back frame and front frame are parallel and form a 0° angle to become a flat rectangle for storage or carry-on, removing the front frame from back frame; and rotating rectangular platform connected by a hinge to the base of the back frame to be parallel with the ground to form a hand-truck.

14. The method of claim 12 further comprising the steps of:
removing the detachable handle from the first plurality of receivers connected to the plurality of side members of the back frame;

removing the front frame from the back frame;

rotating the back frame from a vertical to a horizontal orientation with respect to the ground; and fixing the detachable handle in a second plurality of receivers connected to the a plurality of side members in the back frame, wherein the second plurality of receivers are positioned 90 degrees to the first plurality of receivers for the detachable handle and attaching the removable wheels to the outer frame to form a utility cart.

15. The method of claim 14 further comprising the step of:
attaching a plurality of removable wheels to the outer frame.

* * * * *